United States Patent
Jeong (10) Patent No.: US 6,882,910 B2
(45) Date of Patent: Apr. 19, 2005

(54) METHOD OF CONTROLLING AUTOMATIC GUIDED VEHICLE SYSTEM

(75) Inventor: Chan-Doo Jeong, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 87 days.

(21) Appl. No.: 10/351,999

(22) Filed: Jan. 28, 2003

(65) Prior Publication Data

US 2004/0006416 A1 Jan. 8, 2004

(30) Foreign Application Priority Data

Jul. 5, 2002 (KR) ........................................ 2002-38939

(51) Int. Cl.[7] ................................................ G05D 1/00
(52) U.S. Cl. ..................... 701/23; 318/568.13; 180/167
(58) Field of Search ...................... 701/23, 24; 318/587, 318/618, 652; 180/167

(56) References Cited

U.S. PATENT DOCUMENTS 5,801,506 A  9/1998  Netzler ........................ 318/587
6,345,217 B1 * 2/2002  Zeitler et al. ................. 701/23
2004/0006415 A1 * 1/2004  Kang ........................... 701/23

FOREIGN PATENT DOCUMENTS

JP  11259130  * 9/1999
JP  02000330633  * 11/2000

* cited by examiner

*Primary Examiner*—Thomas G. Black
*Assistant Examiner*—Christine M. Behncke
(74) *Attorney, Agent, or Firm*—Staas & Halsey LLP (57) ABSTRACT

A method of controlling an Automatic Guided Vehicle (AGV) system includes setting moving paths of the AGVs by taking into account task performing costs of cases for orders of all tasks to be performed by the AGVs, and controlling the AGVs according to the set moving paths. The setting of the moving paths includes calculating the cases for the orders of all the tasks to be performed by the AGVs calculating respective costs required for the AGVs to perform the tasks for the calculated cases, calculating the task performing costs using the respective costs, and setting the moving paths of the AGVs according to a case where a minimum one of the calculated task performing costs is incurred.

10 Claims, 9 Drawing Sheets

METHOD OF CONTROLLING AUTOMATIC GUIDED VEHICLE SYSTEM

CROSS-REFERENCE TO RELATED APPLICATION

This application claims the benefit of Korean Application No. 2002-38939, filed Jul. 5, 2002, in the Korean Intellectual Property Office, the disclosure of which is incorporated herein by reference.

BACKGROUND OF THE INVENTION

1. Field of the Invention

The present invention relates generally to a method of controlling an automatic guided vehicle system, and more particularly, to a method of controlling an automatic guided vehicle system having a plurality of automatic guided vehicles, which is capable of efficiently managing the automatic guided vehicles.

2. Description of the Related Art

In general, an Automatic Guided Vehicle (AGV) system is used to automate loading and conveying of articles, and employs an AGV. The AGV is an apparatus used to move loaded articles along a guideline located on a ground. A continuous guideline made of a magnetic tape is installed on a moving path of the AGV, and the AGV detects the guideline via a magnetic sensor, so the AGV travels along the continuous guideline.

Figure 1A:
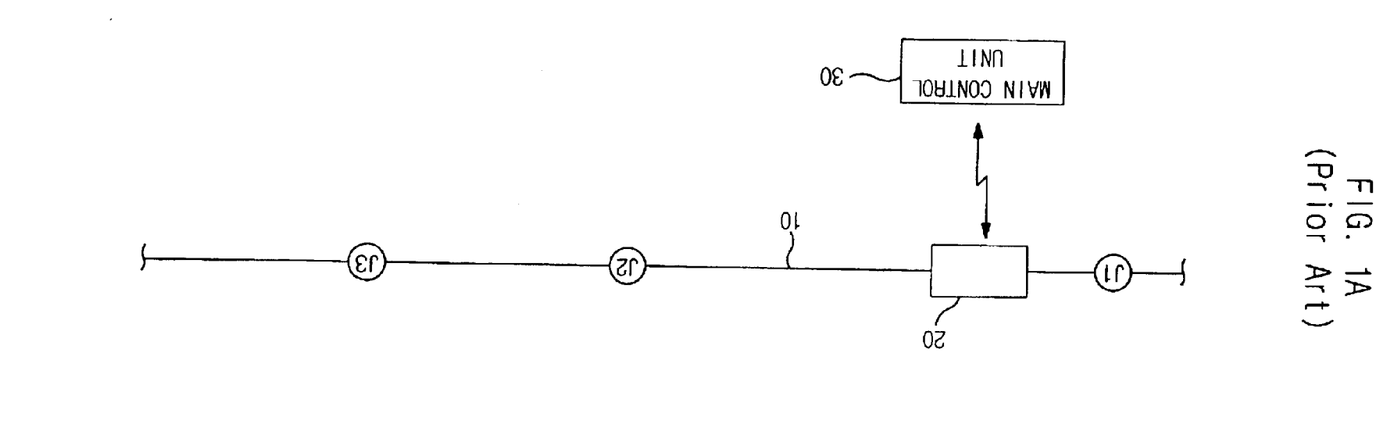
FIG. 1A is a schematic diagram illustrating an operation of a conventional AGV system.

FIG. 1A is a schematic diagram illustrating an operation of a conventional AGV system. Referring to FIG. 1A, in a conventional AGV system, a single AGV 20 performs tasks J1, J2 and J3 on a moving path 10 along which the tasks J1, J2 and J3 exist. The AGV 20 receives task commands transmitted from a main control unit 30, and then performs the tasks while traveling along the moving path 10. The AGV 20 performs the tasks according to an order of reception of the task commands.

Figure 1B:
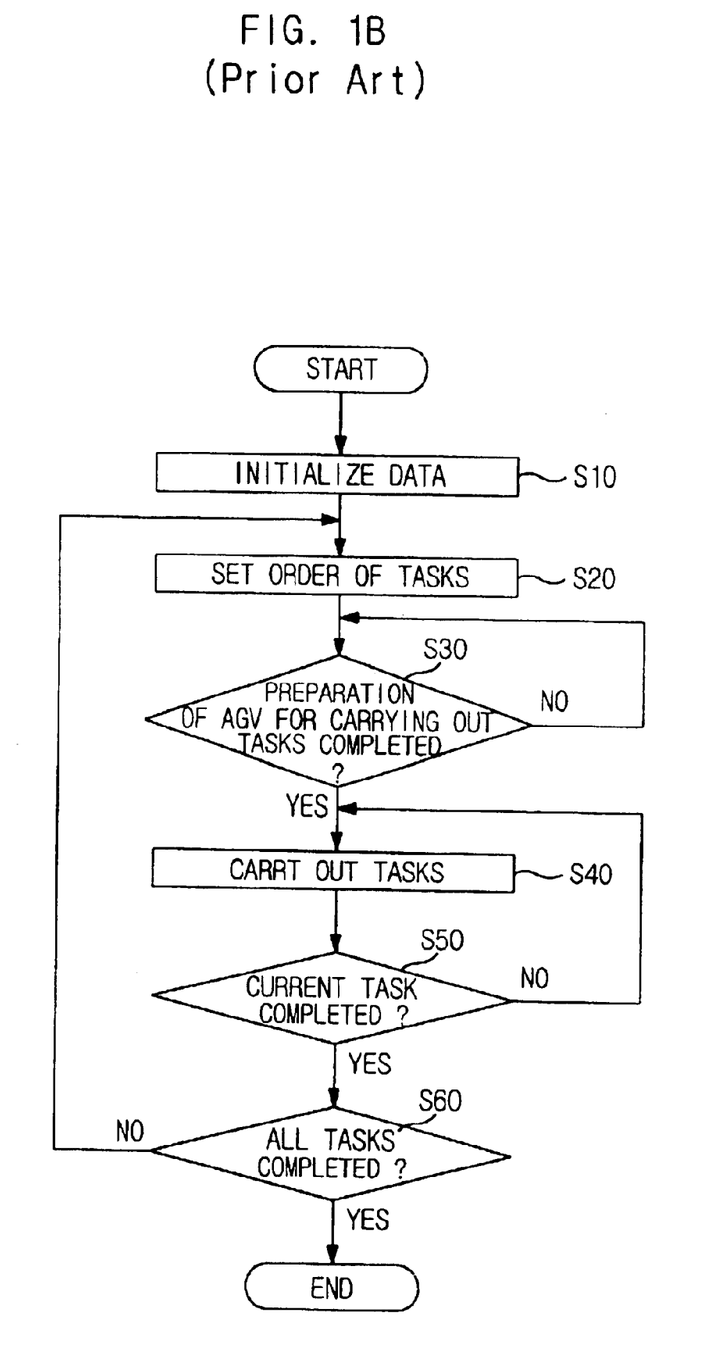
FIG. 1B is a flowchart illustrating a conventional method of controlling the conventional AGV system.

FIG. 1B is a flowchart illustrating a conventional method of controlling the conventional AGV system. Referring to FIG. 1B, the AGV 20 initializes data at operation S10. If the initialization of the data is completed, the AGV 20 receives the task commands from the main control unit 30, and sets an order of the tasks to be performed according to the task commands at operation S20. The AGV 20 sets the order of the tasks to correspond to the order of reception of the task commands transmitted from the main control unit 30 in accordance with a First-In First-Out (FIFO) rule. According to the FIFO rule, a task command which is input first, is the task command which will be output and performed first by the AGV 20.

Thereafter, it is determined whether preparation of the AGV 20 to perform the tasks has been completed at operation S30. If the preparation of the AGV 20 to perform the tasks has been completed, the AGV 20 performs the tasks while traveling along the moving path 10 according to the order of tasks set at operation S20, at operation S40. The AGV 20 first performs a task corresponding to a first received task command in accordance with the FIFO rule as described above. Thereafter, it is determined whether a current task has been completed at operation S50. As a result, if the current task has been completed, it is determined whether all the tasks corresponding to the received task commands have been completed at operation S60. If all the tasks have been completed, a process of the operation of the conventional AGV system is terminated.

As described above, the conventional AGV system has a single AGV and performs the first received task command according to the FIFO rule. That is, when the conventional AGV system is operated to perform task J1, task J2, and task J3, the AGV 20 first performs the task J1, passes the task J2, moves to a location of the task J3 and secondly performs the task J3. Thereafter, the AGV 20 performs the task J2 after moving to a location of the task J2.

Accordingly, since the conventional AGV system uses the single AGV and first performs a first received task without a moving distance being taken into consideration, the moving distance of the single AGV becomes unnecessarily long and causes much time to be consumed to perform tasks, thereby deteriorating efficiency of completing the tasks and productivity of the operation of the AGV system.

SUMMARY OF THE INVENTION

Accordingly, it is an aspect of the present invention to provide a method of controlling an AGV system having a plurality of automatic guided vehicles arranged on a single moving path, which is capable of efficiently managing the AGVs.

Additional aspects and advantages of the invention will be set forth in part in the description which follows and, in part, will be obvious from the description, or may be learned by practice of the invention.

The foregoing and other aspects of the present invention are achieved by providing a method of controlling an AGV system. The AGV system includes a plurality of AGVs. The method of controlling the AGV system includes setting moving paths of the AGVs by taking into account task performing costs of cases for orders of all tasks to be performed by the AGVs, and controlling the AGVs according to the set moving paths.

BRIEF DESCRIPTION OF THE DRAWINGS

The above and other aspects and advantages of the invention will become apparent and more appreciated from the following description of the preferred embodiment, taken in conjunction with the accompanying drawings of which.

DETAILED DESCRIPTION OF THE PREFERRED EMBODIMENT

Reference will now be made in detail to the present preferred embodiment of the present invention, examples of which are illustrated in the accompanying drawings, wherein like reference numerals refer to like elements throughout.

Figure 2:
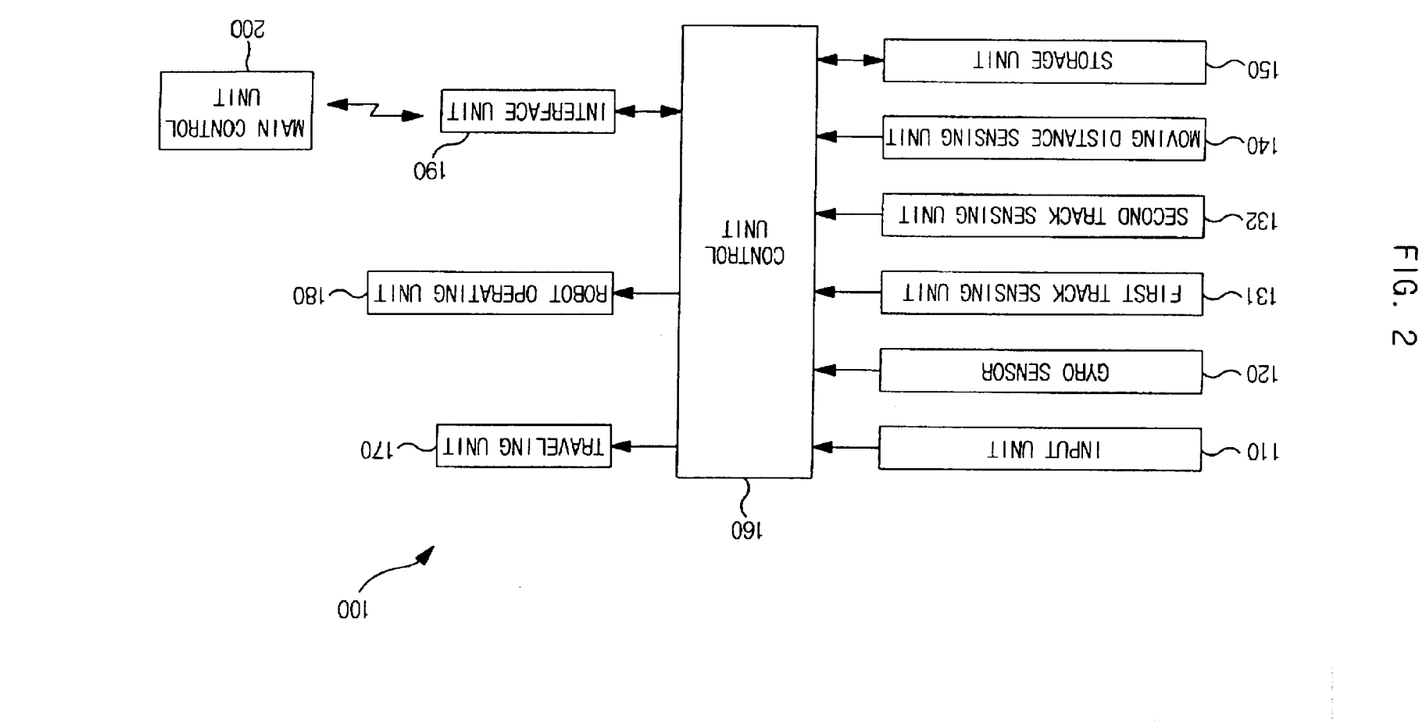
FIG. 2 is a block diagram illustrating a construction of an AGV, according to an embodiment of the present invention.

FIG. 2 is a block diagram illustrating a construction of an AGV, according to an embodiment of the present invention.

Referring to FIG. 2, an AGV 100 of the present invention includes a control unit 160 to control an overall operation of the AGV 100, and an input unit 110 connected to the control unit 160 to set the operation of the AGV 100. The input unit 110 includes a key input unit to allow information to be directly entered by hand.

Additionally, the AGV 100 includes a first track sensing unit 131 and a second track sensing unit 132 provided on front and rear ends of the AGV 100, respectively, to detect guide tags installed on moving paths of the AGV 100. The AGV 100 also a gyro sensor 120 to sense location and angle of movement of the AGV 100, and a moving distance sensing unit 140 to detect a moving distance of the AGV 100. The first and second track sensing units 131 and 132, and the moving distance sensing unit 140 are each electrically connected to the control unit 160. Additionally, the AGV 100 includes a storage unit 150 electrically connected to the control unit 160 to store a control program, information inputted by the input unit 110, and data generated during the operation of the AGV 100. The AGV 100 includes a traveling unit 170 to move the AGV 100 by operating wheels (not shown) according to the control of the control unit 160, and a robot operating unit 180 to operate a robot according to the control of the control unit 160. The AGV 100 also includes an interface unit 190 connected to the control unit 160 to wirelessly access a main control unit 200.

The above-described first and second track sensing units 131 and 132 are used to detect the guide tags, and are used as sensors to sense magnetic fields. Additionally, the moving distance sensing unit 140 may be used as encoders that are installed on wheels to allow the AGV 100 to travel. In this case, the control unit 160 calculates the moving distance of the AGV 100 by counting pulses outputted from the encoder.

Figure 3:
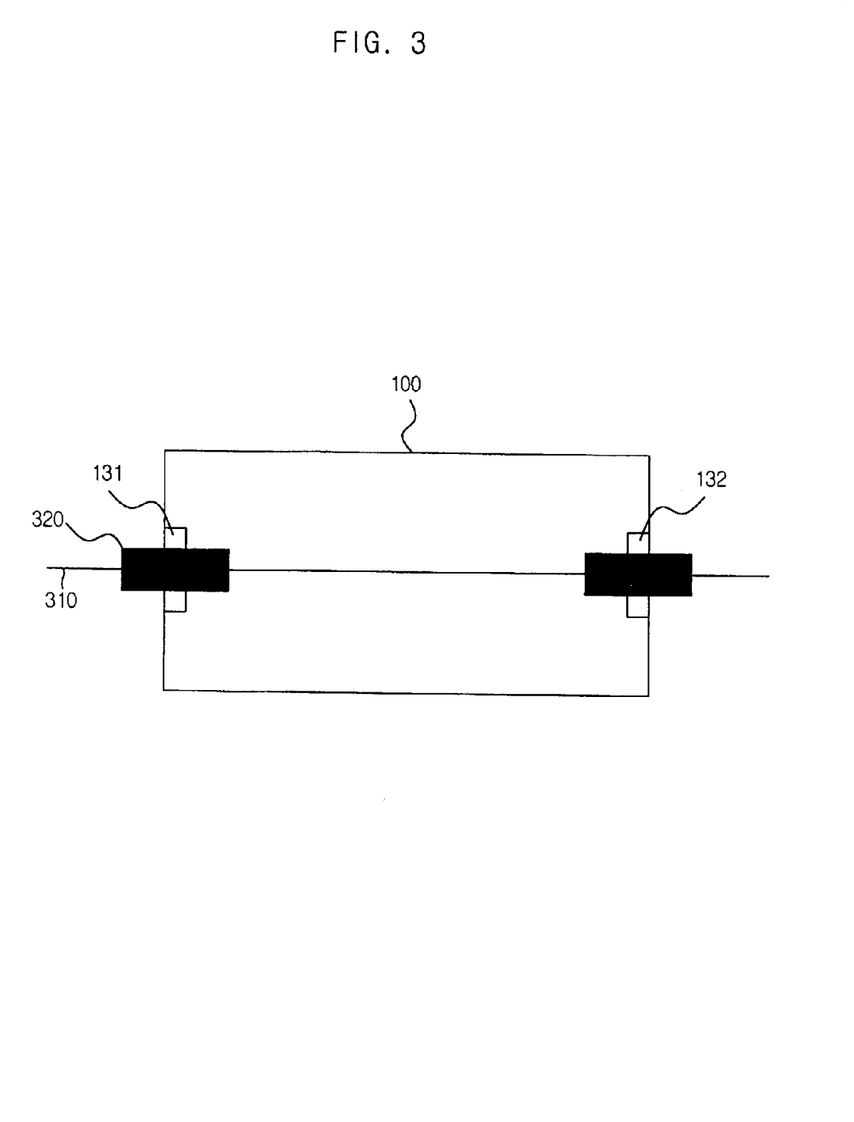
FIG. 3 is a diagram illustrating guide tags of the present invention.

FIG. 3 is a diagram illustrating the guide tags of the present invention. The guide tags 320 are magnetic tapes having a certain length, and are installed along the moving path 310 at certain intervals. As shown in FIG. 3, a pair of guide tags 320 are formed to be separated at one of the intervals. Each of the intervals is separated by a distance the same as a distance between the first and second track sensing units 131 and 132.

Figure 4:
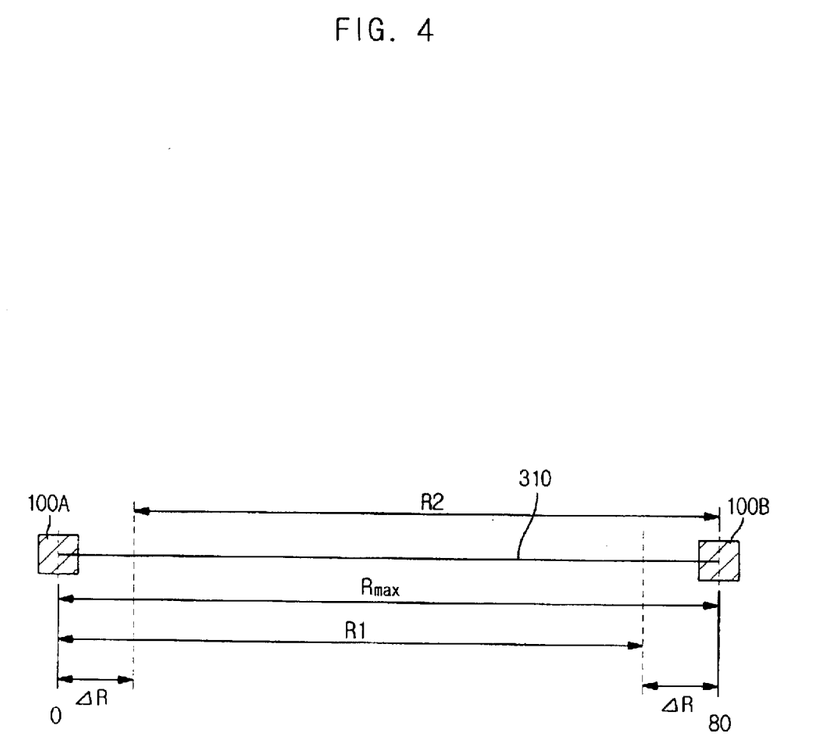
FIG. 4 is a diagram illustrating a construction of an AGV system of the present invention.

FIG. 4 is a diagram illustrating a construction of an AGV system of the present invention. Referring to FIG. 4, a first AGV 100A and a second AGV 100B are located along the moving path 310. A maximum value of the moving path 310 is $R_{max}$.

Two interference prevention sections $\Delta R$ are set to prevent interference between the first and second AGVs 100A and 100B on the moving path 310 that exists between the first and second AGVs 100A and 100B. Accordingly, a section along which the first AGV 100A moves is R1, and a section along which the second AGV 100B moves is R2. The first and second AGVs 100A and 100B, each have the same construction as the AGV 100 described in FIG. 2 above.

An operation of the AGV system of the present invention is described herein below.

When n tasks are given, a number of cases for an order of the n tasks is (2n)! because an unloading sub-task U through which articles are unloaded from a certain apparatus to an AGV, and a loading sub-task L through which the articles are loaded from the AGV to another certain apparatus are required for each of the n tasks. That is, when two tasks a and b are given, the number of cases for the order of the two tasks is (2(2))!=24. The cases for the order of the two tasks performed by a single AGV is shown in Table 1.

TABLE 1

| Case number | Order of tasks | Application |
|---|---|---|
| 1 | a_U->a_L->b_U->b_L | ○ |
| 2 | a_U->a_L->b_L->b_U | X |
| 3 | a_U->b_L->a_L->b_U | X |
| 4 | a_U->b_L->b_U->a_L | X |
| 5 | a_U->b_U->b_L->a_L | ○ |
| 6 | a_U->a_L->b_U->b_L | ○ |
| 7 | a_L->a_U->b_U->b_L | X |
| 8 | a_L->a_U->b_L->b_U | X |
| 9 | a_L->b_L->a_U->b_U | X |
| 10 | a_L->b_L->b_U->a_U | X |
| 11 | a_L->b_U->b_L->a_U | X |
| 12 | a_L->b_U->a_U->b_L | X |
| 13 | b_U->a_L->a_U->b_L | X |
| 14 | b_U->a_L->b_L->a_U | X |
| 15 | b_U->b_L->a_L->a_U | X |
| 16 | b_U->b_L->a_U->a_L | ○ |
| 17 | b_U->a_U->b_L->a_L | ○ |
| 18 | b_U->a_U->a_L->b_L | ○ |
| 19 | b_L->a_L->b_U->a_U | X |
| 20 | b_L->a_L->a_U->b_U | X |
| 21 | b_L->a_U->a_L->b_U | X |
| 22 | b_L->a_U->b_U->a_L | X |
| 23 | b_L->b_U->a_U->a_L | X |
| 24 | b_L->b_U->a_L->a_U | X | a_U: unloading for task a
a_L: loading for task a
b_U: unloading for task b
b_L: loading for task b
○: application X: no application Among the twenty-four cases described above, cases in which the loading sub-tasks through which articles are carried from an AGV to a certain apparatus are first performed, are ineffective and cannot be adopted as applications. That is, the order of an unloading sub-task U to a loading sub-task L should be satisfied for both tasks a and b.

A method of controlling the AGV system according to the present invention is described herein below.

Figure 5:
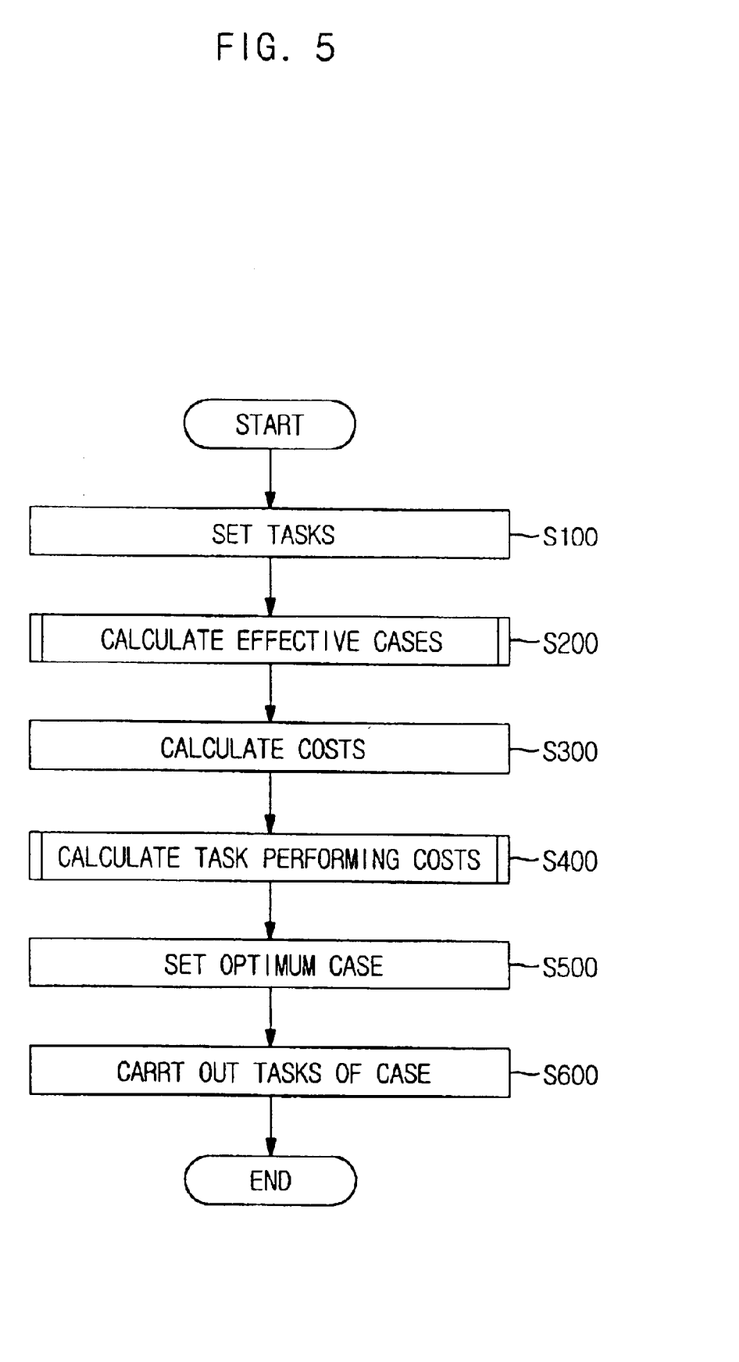
FIG. 5 is a flowchart illustrating a method of controlling the AGV system of the present invention.
Figure 6:
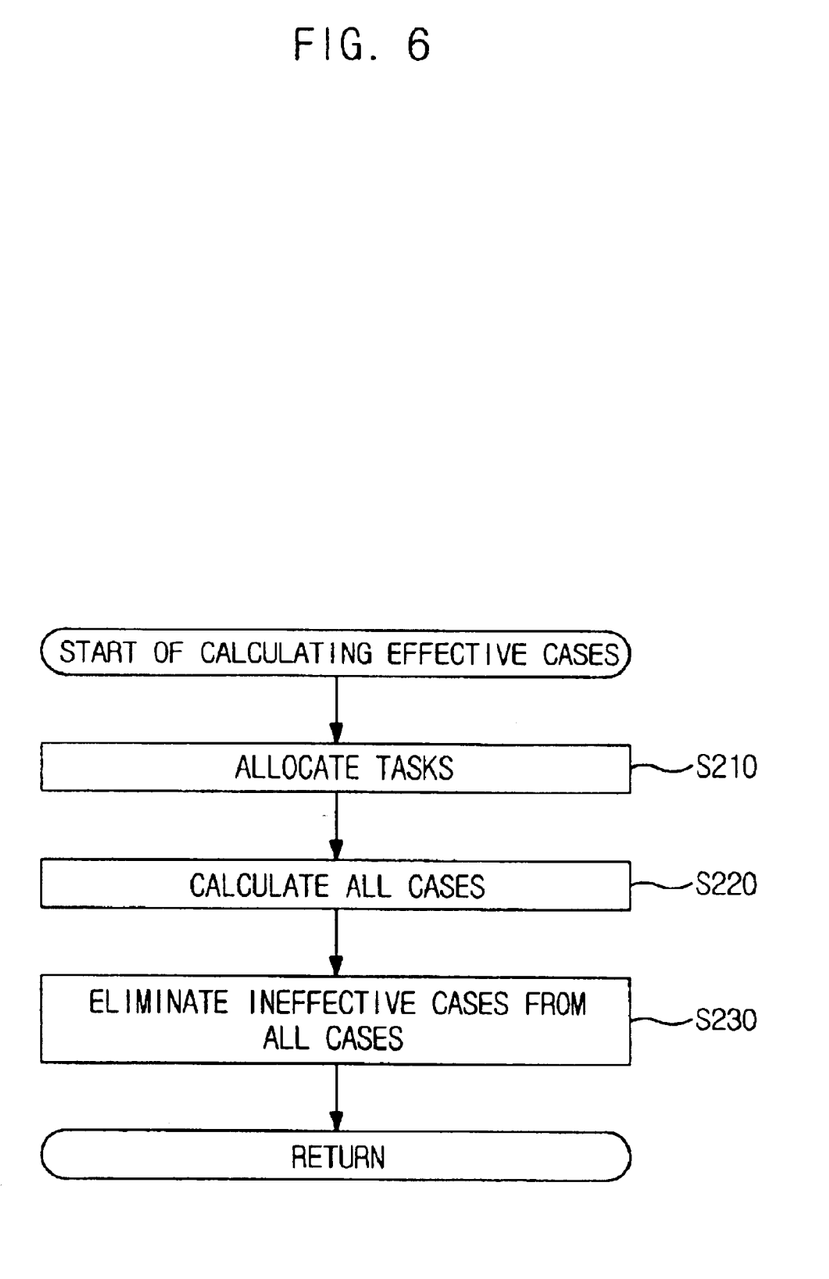
FIG. 6 is a flowchart illustrating the AGV system control method of the present invention in more detail.
Figure 7:
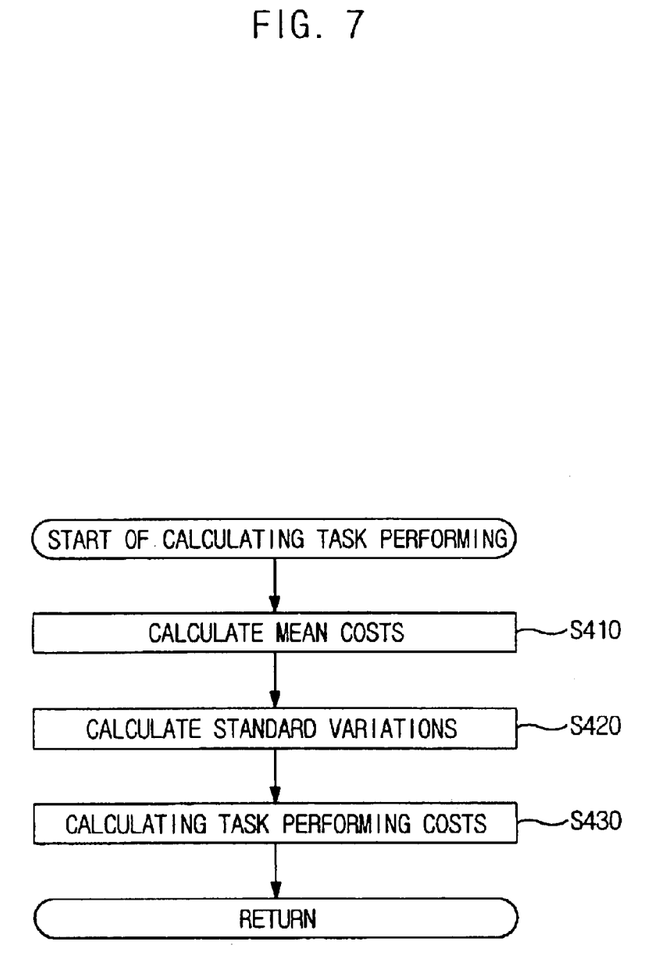
FIG. 7 is another flowchart illustrating the AGV system control method of the present invention in more detail.

FIGS. 5 through 7 are flowcharts illustrating the AGV system control method of the present invention.

FIG. 5 is a schematic flowchart illustrating the AGV system control method of the present invention. First, when tasks to be performed are given, an operation of setting tasks is performed at operation S100. Thereafter, effective cases for orders of all the tasks are calculated at operation S200.

FIG. 6 is a flowchart illustrating the AGV system control method of the present invention in more detail. That is, operation S200 of calculating the effective cases is shown in more detail in FIG. 6.

If for the two AGVs 100A and 100B, n tasks (e.g., six tasks, 0 to 5) are given, the main control unit 200 allocates the six tasks to the two AGVs 100A and 100B and calculates the cases. For example, the main control unit 200 sets i and j to 0~5 and i~5, respectively, allocates i~j tasks to the first AGV 100A and allocates 0~(i−1) and (j+1)~5 tasks to the second AGV 100B. Therefore, the main control unit 200 sets task i and j, and allocates the tasks to AGV 100A and 100B to obtain all the cases that the AGV 100A and 100B peforms at operation S210.

Thereafter, the main control unit 200 calculates all the cases for the orders of all the tasks allocated to the AGV 100A and 100B as shown in Table 1 at operation S220. Then, the main control unit 200 eliminates ineffective cases from the calculated cases at operation S230. That is, the cases where the order of an unloading sub-task U to a loading sub-task L is not satisfied for all of the tasks are eliminated from the calculated cases. Additionally, the cases in which one of the AGVs 100A and 100B enters the interference prevention sections ΔR as shown in FIG. 4, are also eliminated from the calculated cases.

At operation S300 (see FIG. 5), respective costs required to perform the tasks are calculated for the effective cases calculated at operation S200.

Here, each of the respective costs may be represented as a sum of moving time t required for one of the AGVs 100A and 100B to move in order to perform a corresponding task. The moving time t may include an unloading time required to unload one or more articles, and a loading time required to load the articles.

Figure 8:
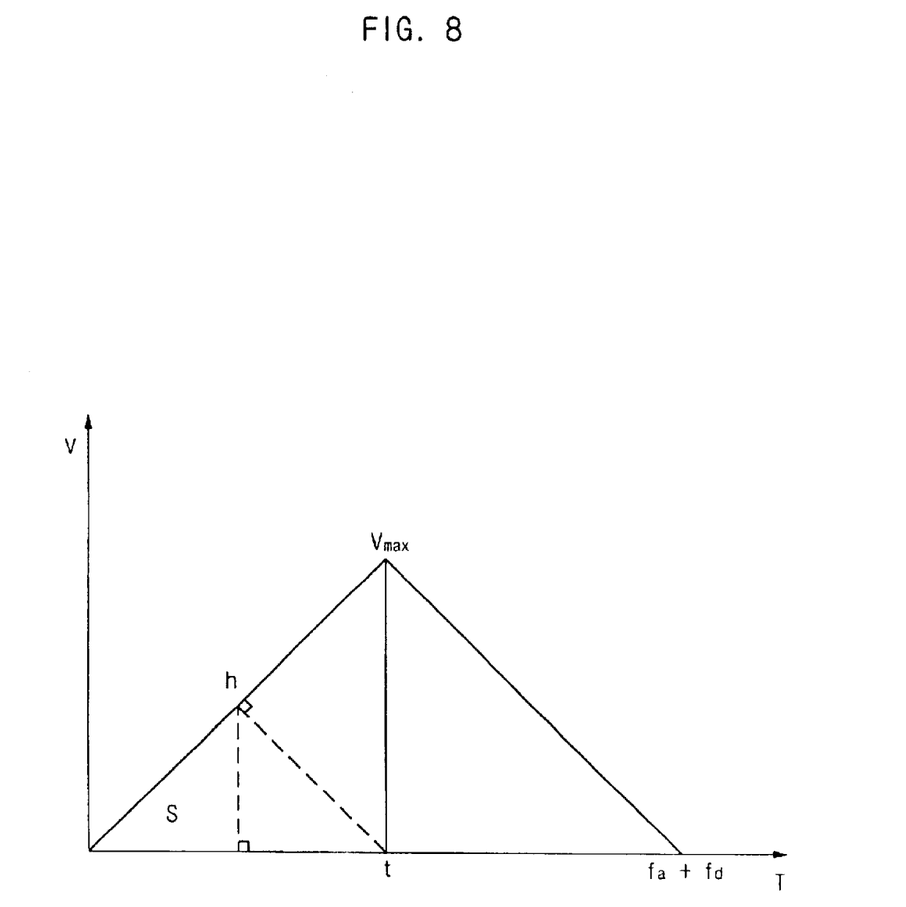
FIG. 8 is a graph illustrating the AGV system control method of the present invention.

The operation of calculating the respective costs is described in FIG. 8. FIG. 8 is a graph illustrating the AGV system control method of the present invention.

The AGVs 100A and 100B move to positions where the corresponding tasks to be performed exist. A maximum velocity of both AGVs 100A and 100B is V max, time required to accelerate to the maximum velocity V max is fa, and time required to decelerate from the maximum velocity V max to zero is fd. P max represents the total distance of the AGVs 100A and 100B acceleration distance from a stationary state, traveling distance at the maximum velocity, and deceleration distance from the maximum velocity to the stationary state.

If the traveling distance at the maximum velocity is zero, a time-speed graph is obtained as shown in FIG. 8 (see large triangle Δ(S Vmax fa+fd). The s represents a distance that the AGVs 100A and 100B must move to perform the tasks. If s<P max, then the time-speed graph is obtained as indicated by the small triangle Δ(s h t).

In the present invention, fa and fd are 2 and 3 seconds, respectively, and the unloading time and loading time each are 10 seconds.

According to FIG. 8, P max and s are calculated by $$P\max = \frac{(fa + fd)V\max}{2}$$

and $$s = \frac{t \times h}{2} V\max \frac{t^2}{2(fa + fd)},$$

respectively.

Thus, the moving time t is calculated by $$t = \sqrt{\frac{2s(fa + fd)}{V\max}}$$

if s<P max, while the moving time t is calculated by $$t = (fa + fd) + \frac{(s - P\max)}{V\max}$$

for other cases.

The time required to perform each of the tasks is calculated by adding the moving time t, calculated by the above process, and the unloading time (10 seconds) and the loading time (10 seconds). That is, each of the respective costs is calculated by adding the moving time t required for one of the AGVs 100A and 100B to move to perform a corresponding task, the unloading time required to unload one or more articles, and the loading time required to load the articles.

At operation S400, a task performing cost C is calculated with respect to each of the respective costs for each of the effective cases calculated at operation S300 (see FIG. 5).

First, a mean cost M is calculated by dividing a sum of the respective costs for each of the effective cases by the number of the tasks of the case at operation S410.

Next, a standard variation σ of the mean cost M is calculated by the following equation for each of the effective cases at operation S420. The mean cost M and the standard variation a have a relation of M=3σ.

Then, the task performing cost C is calculated using the mean cost M and the standard variation σ (C is calculated by C=αM+βσ) at operation S430. The α is a mean cost rate and β is a standard variation rate. Both, α and β are preset constant values determined according to the AGV system.

If the task performing costs C are calculated for the effective cases at operation S400, the main control unit 200 sets a case, where a minimum one of the calculated task performing costs C is incurred, to an optimum case. Thereafter, the main control unit 200 sets moving paths according to the set optimum case, and transmits information about the corresponding moving paths to the corresponding AGVs at operation S500.

At operation S600, the respective control units 160 of the AGVs 100A and 100B receive data set according to the optimum case from the main control unit 200 through the interfaces 190, store the data in the storage units 150, and perform tasks according to the data.

In accordance with the above, it will be appreciated that mean moving time is short and standard variation is small in the AGV system control method of the present invention when compared to the prior art as shown in Table 2.

TABLE 2

|  | 100 movements/hr | | 120 movements/hr | | 130 movements/hr | |
| --- | --- | --- | --- | --- | --- | --- |
|  | Mean moving time | Standard variation | Mean moving time | Standard variation | Mean moving time | Standard variation |
| Prior art | 109.84 | 39 | 478 | 206 | 1007 | 554 |
| Present invention | 56.66 | 31.1 | 81 | 65 | 112 | 77 |

As described above, the AGV system control method of the present invention reduces the mean moving time by calculating an optimum case and controls corresponding AGVs based on the calculated optimum case, thereby improving productivity of the AGV system for an increased amount of tasks.

Although a preferred embodiment of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling an Automatic Guided Vehicle (AGV) system having a plurality of AGVs, comprising:
    setting moving paths of the AGVs by taking into account task performing costs of cases for orders of all tasks to be performed by the AGVs; and controlling the AGVs according to the set moving paths to determine an optimum case, so that the AGVs are controlled based on the optimum case.

2. The method according to claim 1, wherein the setting of the moving paths comprises:

calculating the cases for the orders of all the tasks to be performed by the AGVs;

calculating respective costs required for the AGVs to perform the tasks for the calculated cases;

calculating the task performing costs using the respective costs; and setting the moving paths of the AGVs according to a respective case where a minimum one of the calculated task performing costs is incurred.

3. The method according to claim 2, wherein the cases where an order of an unloading sub-task to a loading sub-task is not satisfied and one of the AGVs enters one of a preset interference prevention sections, are excluded to achieve effective cases.

4. The method according to claim 3, wherein, if a current case does not coincide with one of the effective cases and one the AGVs enters one of the interference prevention sections, a first one of the AGVs is controlled to be spaced apart from a second one.

5. The method according to claim 2, wherein the calculating of the task performing costs comprises:

calculating a sum of the respective costs for each of the cases;

calculating a mean cost and a standard variation using the sum of the respective costs and a number of the tasks for each of the cases; and calculating each of the task performing costs using the mean cost and the standard variation for each of the cases.

6. The method according to claim 5, wherein each of the task performing costs is calculated using the following equation:

$$C = \alpha M + \beta \sigma$$

wherein C: task performing cost,

α: mean cost rate,

M: mean cost,

β: standard variation rate, and

σ: standard variation.

7. The method according to claim 6, wherein the mean cost rate and the standard variation rate are preset constant values.

8. The method according to claim 2, wherein each of the respective costs is calculated by adding a moving time required for the respective AGV to move to perform a corresponding task, a time required for the respective AGV to unload one or more articles, and a time required for the respective AGV to load the articles.

9. The method according to claim 8, wherein the moving time t is calculated by the following equations:

$$t = \sqrt{\frac{2s(fa + fd)}{V\max}} \text{ if } s < P\max, \text{ and}$$

$$t = (fa + fd) + \frac{(s - P\max)}{V\max} \text{ for other cases,}$$

$$\text{wherein } P\max = \frac{(fa + fd)V\max}{2},$$

$$s = \frac{t \times h}{2} = V\max \frac{t^2}{2(fa + fd)}$$

t: moving time,

Vmax: maximum velocity of all the AGVs, fa: time required to accelerate to the maximum velocity, and fd: time required to decelerate from the maximum velocity Vmax to zero.

10. The method according to claim 2, wherein the calculating of the cases comprises:

setting i and j to 0~n and i~5 according to two AGVs and tasks 0~n, respectively, allocating i~j tasks to a first one of the AGVs and allocating 0~(i−1) and (j+1)~n tasks to a second one of the AGVs.

* * * * *

UNITED STATES PATENT AND TRADEMARK OFFICE
CERTIFICATE OF CORRECTION

PATENT NO.     : 6,882,910 B2
DATED          : April 19, 2005
INVENTOR(S)    : Chan-Doo Jeong It is certified that error appears in the above-identified patent and that said Letters Patent is hereby corrected as shown below:

Title page,
Item [75], Inventor, change "Suwon" to -- Suwon-si --.

Column 7,
Line 22, after "of" insert -- one --.

Signed and Sealed this

Third Day of January, 2006

JON W. DUDAS
*Director of the United States Patent and Trademark Office*